US012040109B2

(12) United States Patent
Matus et al.

(10) Patent No.: US 12,040,109 B2
(45) Date of Patent: Jul. 16, 2024

(54) CIRCUIT PROTECTION DEVICE WITH PTC DEVICE AND BACKUP FUSE

(71) Applicant: Littelfuse, Inc., Chicago, IL (US)

(72) Inventors: Yuriy Borisovich Matus, Pleasanton, CA (US); Martin G. Pineda, Fremont, CA (US); Sergio Fuentes, Newark, CA (US)

(73) Assignee: LITTELFUSE, INC., Chicago, IL (US)

( * ) Notice: Subject to any disclaimer, the term of this patent is extended or adjusted under 35 U.S.C. 154(b) by 161 days.

(21) Appl. No.: 17/779,007

(22) PCT Filed: Nov. 13, 2020

(86) PCT No.: PCT/US2020/060381

§ 371 (c)(1),
(2) Date: May 23, 2022

(87) PCT Pub. No.: WO2021/101800

PCT Pub. Date: May 27, 2021

(65) Prior Publication Data

US 2023/0037262 A1 Feb. 2, 2023

Related U.S. Application Data

(60) Provisional application No. 62/938,762, filed on Nov. 21, 2019.

(51) Int. Cl.
*H01C 7/02* (2006.01)
*H01C 1/08* (2006.01)
(Continued)

(52) U.S. Cl.
CPC ............... *H01C 7/027* (2013.01); *H01C 1/08* (2013.01); *H01C 1/1406* (2013.01); (Continued)

(58) Field of Classification Search
CPC ........ H01C 7/027; H01C 1/08; H01C 1/1406; H01H 85/0241; H01H 85/048; H01H 2085/0483
See application file for complete search history.

(56) References Cited

U.S. PATENT DOCUMENTS 5,097,247 A 3/1992 Doerrwaechter
9,620,318 B2 * 4/2017 Matthiesen .......... H01H 37/761
(Continued)

FOREIGN PATENT DOCUMENTS

CN 1240050 A 12/1999
DE 112020002298 T5 3/2022
(Continued)

OTHER PUBLICATIONS

European Search Report and Written Opinion for the Application No. EP20889010, dated Feb. 24, 2023, 7 pages.
(Continued)

*Primary Examiner* — Kyung S Lee
(74) *Attorney, Agent, or Firm* — KDW Firm PLLC

(57) ABSTRACT

A circuit protection device including a positive temperature coefficient (PTC) device and a backup fuse electrically connected in series with one another, the backup fuse comprising a quantity of solder disposed on a dielectric chip and having a melting temperature that is higher than a trip temperature of the PTC device, wherein the a surface of the dielectric chip exhibits a de-wetting characteristic relative to the solder such that, when the solder is melted, the solder draws away from the surface to create a galvanic opening in the backup fuse.

18 Claims, 4 Drawing Sheets

(51) Int. Cl.

*H01C 1/14* (2006.01)
*H01H 85/02* (2006.01)
*H01H 85/048* (2006.01)

(52) U.S. Cl.

CPC ...... *H01H 85/0241* (2013.01); *H01H 85/048* (2013.01); *H01H 2085/0483* (2013.01)

(56) References Cited

U.S. PATENT DOCUMENTS

| | | | |
|---|---|---|---|
| 2015/0294826 | A1 | 10/2015 | Kim et al. |
| 2015/0303018 | A1 | 10/2015 | Banba |
| 2016/0043370 | A1 | 2/2016 | Hatta et al. |
| 2019/0013167 | A1 | 1/2019 | Sherrima |

FOREIGN PATENT DOCUMENTS

| | | | |
|---|---|---|---|
| EP | 1912236 | A1 | 4/2008 |
| JP | H01214095 | A | 8/1989 |
| JP | 2000243200 | A | 9/2000 |
| JP | 2000306477 | A | 11/2000 |
| JP | 2002150918 | A | 5/2002 |
| JP | 2005007668 | A | 1/2005 |
| JP | 2016225090 | A | 12/2016 |
| JP | 2017002115 | A | 1/2017 |
| WO | 2014109364 | A1 | 7/2014 |

OTHER PUBLICATIONS

International Search Report and Written Opinon dated Feb. 5, 2021 for PCT/US2020/060381.

* cited by examiner

CIRCUIT PROTECTION DEVICE WITH PTC DEVICE AND BACKUP FUSE

BACKGROUND

Field

The present disclosure relates generally to the field of circuit protection devices. More specifically, the present disclosure relates to a circuit protection device including a positive temperature coefficient device and a backup fuse for facilitating galvanic opening during extreme fault conditions.

Description of Related Art

Fuses are commonly used as circuit protection devices and are typically installed between a source of electrical power and a component in an electrical circuit that is to be protected. A conventional fuse includes a fusible element disposed within a hollow, electrically insulating fuse body. Upon the occurrence of a fault condition, such as an overcurrent condition, the fusible element melts or otherwise separates to interrupt the flow of electrical current through the fuse.

When the fusible element of a fuse separates as a result of an overcurrent condition, it is sometimes possible for an electrical arc to propagate through the air between the separated portions of the fusible element (e.g., through vaporized particulate of the melted fusible element). If not extinguished, this electrical arc may allow significant follow-on currents to flow to from a source of electrical power to a protected component in a circuit, resulting in damage to the protected component despite the physical opening of the fusible element.

One solution that has been implemented to eliminate electrical arcing in fuses is to replace the fusible element of a fuse with a positive temperature coefficient (PTC) element. A PTC element is formed of a PTC material composed of electrically conductive particles suspended in a non-conductive medium (e.g., a polymer). PTC materials exhibit a relatively low electrical resistance within a normal operating temperature range. However, when the temperature of a PTC material exceeds the normal operating temperature range and reaches a "trip temperature," such as may result from excessive current flowing through the PTC material, the resistance of the PTC material increases sharply. This increase in resistance mitigates or arrests the flow of current through the PTC element. Subsequently, when the PTC material cools (e.g., when the overcurrent condition subsides), the resistance of the PTC material decreases, and the PTC element becomes conductive again. The PTC element thus acts as a resettable fuse. Since the PTC element does not physically open in the manner of a fusible element, there is no opportunity for an electrical arc to form or propagate.

While PTC elements have proven to be effective for providing overcurrent protection in circuits while mitigating electrical arcing, they are also prone to fail in an unpredictable manner when subjected to extreme fault conditions. For example, if a PTC element is subjected to an amount of current well above its rated capacity, the PTC element may, in some cases, fail in a manner that results in the PTC element becoming highly conductive and allowing the overcurrent to flow to connected devices (i.e., failing in a closed state, or "failing closed"). An extreme overcurrent condition may also result in combustion of the PTC element, potentially causing damage to surrounding components. Thus, it is desirable to provide a circuit protection device that leverages the arc-mitigating benefits of a PTC element while ensuring that extreme fault conditions do not cause the PTC element to fail in a dangerous or catastrophic manner. It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A circuit protection device in accordance with a non-limiting embodiment of the present disclosure may include positive temperature coefficient (PTC) device and a backup fuse electrically connected in series with one another, the backup fuse comprising a quantity of solder disposed on a dielectric chip and having a melting temperature that is higher than a trip temperature of the PTC device, wherein the a surface of the dielectric chip exhibits a de-wetting characteristic relative to the solder such that, when the solder is melted, the solder draws away from the surface to create a galvanic opening in the backup fuse.

Another circuit protection device in accordance with a non-limiting embodiment of the present disclosure may include a positive temperature coefficient (PTC) device and a backup fuse electrically connected in series with one another, the backup fuse comprising a cartridge fuse having a fusible element with a melting temperature that is higher than a trip temperature of the PTC device, wherein a fuse body of the cartridge fuse exhibits a de-wetting characteristic relative to the fusible element such that, when the fusible element is melted, the fusible element draws away from a surface of the fuse body to create a galvanic opening in the fusible element.

DETAILED DESCRIPTION

An exemplary embodiment of a circuit protection device in accordance with the present disclosure will now be described more fully hereinafter with reference to the accompanying drawings. The circuit protection device may, however, be embodied in many different forms and should not be construed as being limited to the embodiments set forth herein. Rather, these embodiments are provided so that this disclosure will convey certain exemplary aspects of the circuit protection device to those skilled in the art.

Figure 1:
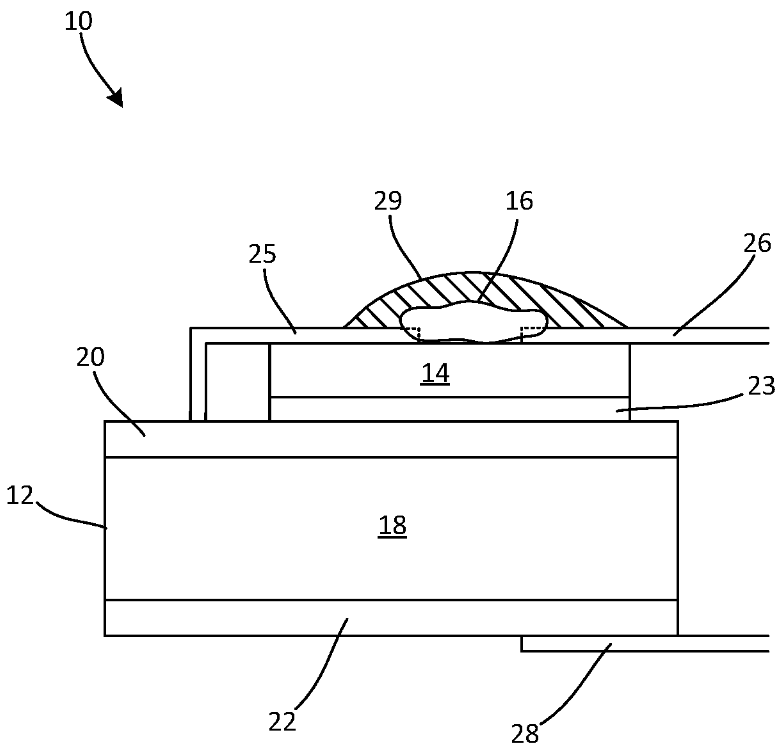
FIG. 1 is a side view illustrating a circuit protection device in accordance with an exemplary embodiment of the present disclosure.

Referring to FIG. 1, a side view illustrating a circuit protection device 10 (hereinafter "the device 10") in accordance with an exemplary embodiment of the present disclosure is shown. The device 10 may generally include a positive temperature coefficient (PTC) device 12, a dielectric chip 14, and a backup fuse 16. For the sake of convenience and clarity, terms such as "front," "rear," "top," "bottom," "up," "down," "above," "below," etc. may be used herein to describe the relative placement and orientation of various components of the device 10, each with respect to the geometry and orientation of the device 10 as it appears in FIG. 1. Said terminology will include the words specifically mentioned, derivatives thereof, and words of similar import.

The PTC device 12 may be a laminate structure that generally includes a PTC element 18 with electrically conductive top and bottom electrodes 20, 22 disposed on top and bottom surfaces thereof. The top and bottom electrodes 20, 22 may be formed of any suitable, electrically conductive material, including, but not limited to, copper, gold, silver, nickel, tin, etc. The PTC element 18 may be formed of any type of PTC material (e.g., polymeric PTC material, ceramic PTC material, etc.) formulated to have an electrical resistance that increases as the temperature of the PTC element 18 increases. Particularly, the PTC element 18 may have a predetermined "trip temperature" above which the electrical resistance of the PTC element 18 rapidly and drastically increases (e.g., in a nonlinear fashion) in order to substantially arrest current passing therethrough. In a non-limiting, exemplary embodiment of the device 10, the PTC element 18 may have a trip temperature in a range of 80 degrees Celsius to 130 degrees Celsius.

The dielectric chip 14 may be a substantially planar member disposed atop the top electrode 20 and affixed thereto by a layer of thermally conductive paste 23 or other thermally conductive medium. The dielectric chip 14 may be formed of a low surface energy, electrically insulating, thermally resistant material. Examples of such materials include, but are not limited to, perfluoroalkoxy (PFA), ethylene tetrafluoroethylene (ETFE), or polyvinylidene fluoride (PVDF).

The backup fuse 16 may be formed of a quantity of solder that is disposed on the top surface of the dielectric chip 14. An electrically conductive trace or lead 25 may extend from the backup fuse 16 around a side of the dielectric chip 14 and into electrical connection with the top electrode 20 of the PTC device 12 (e.g., via solder connection). Electrically conductive first and second lead wires 26, 28 may extend from the backup fuse 16 and the bottom electrode 22 of the PTC device 12, respectively, for facilitating electrical connection of the device 10 within a circuit. Thus, the backup fuse 16, the lead 25, and PTC device 12 may be electrically connected in series and may provide a current path between the first and second lead wires 26, 28. In various embodiments, the backup fuse 16 may be covered with a dielectric passivation layer 29 for shielding the backup fuse 16 from external contaminants and short-circuiting with external components. The passivation layer 29 may be formed of epoxy, polyimide, etc. or other material that may exhibit a "de-wetting" characteristic with regard to the backup fuse 16 as further described below.

The solder from which the backup fuse 16 is formed may be selected to have a melting temperature that is significantly higher than the trip temperature of the PTC element 18. Specifically, the solder may have a trip temperature that is above a temperature range for which the PTC device 12 is known to operate in a reliable manner, hereinafter referred to as the "normal trip temperature range" of the PTC device 12. In various embodiments, the solder may have a melting temperature that is in a range of 1 degree Celsius to 100 degrees Celsius greater than the normal trip temperature range of the PTC element 18. Thus, if excessive current flows through the backup fuse 16 and the PTC device 12, the PTC element 18 may heat up and reach its trip temperature, arresting current flowing therethrough, well before the backup fuse 16 is sufficiently heated to melt (as described in greater detail below). However, in the event of an extreme fault condition (e.g., an extreme overcurrent condition), wherein the PTC element 18 may be heated to temperatures in excess of its trip temperature (e.g., more than several hundred degrees Celsius over its trip temperature), the heat generated by the extreme fault condition, including heat emitted by the PTC element 18, may be sufficient to melt the backup fuse 16 as further described below before polymer in pPTC gets ignited.

The solder from which the backup fuse 16 is formed and the material from the which the dielectric chip 14 is formed may be selected such that, when the solder is in a melted or semi-melted state, the solder may have an aversion to, or a tendency to draw away from or to bead on, the surface of the dielectric chip 14. That is, the material of the dielectric chip 14 may exhibit a significant "de-wetting" characteristic relative to the solder from which the backup fuse 16 is formed. In one example, the dielectric chip 14 may be formed of PFA and the solder may be SAC305 solder. In another example, the dielectric chip 14 may be formed of ETFE and the solder may be eutectic solder. In another example, the dielectric chip 14 may be formed of Fr-4, PI (polyimide) and the solder may be a high melt solder (i.e., solder with a melting temperature above 260 degrees Celsius). The present disclosure is not limited in this regard.

Figure 2:
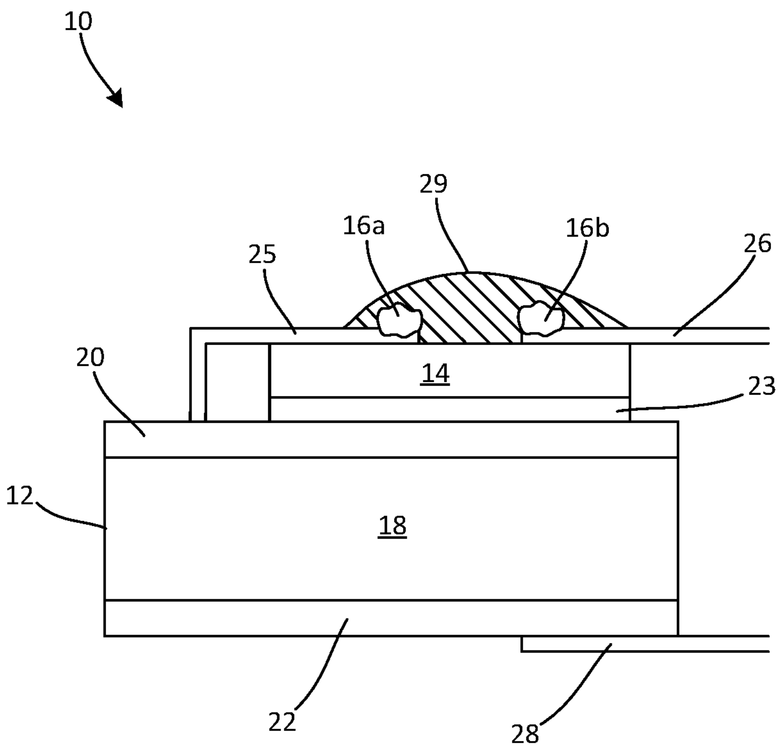
FIG. 2 is a side view illustrating the circuit protection device shown in FIG. 1 with the backup fuse of the circuit protection device in an open state.

During normal operation, the device 10 may be connected in a circuit (e.g., between a source of electrical power and a load) by the lead wires 26, 28, and current may flow between the lead wires 26, 28 through a path that includes the backup fuse 16, the lead 25, and the PTC device 12. Upon the occurrence of an overcurrent condition, wherein current flowing through the device 10 causes the PTC element 18 to reach a temperature within its normal trip temperature range, the resistance of the PTC element 18 may rapidly increase and substantially arrest current flowing therethrough, thus protecting connected circuit components from damage that could otherwise result from the overcurrent condition. Once the overcurrent condition subsides and the PTC element 18 cools to a temperature below its normal trip temperature range, the PTC element 18 may become electrically conductive again and the device 10 may resume normal operation. However, upon the occurrence of an extreme overcurrent condition, wherein current flowing through the device 10 causes the PTC element 18 to reach a temperature above its normal trip temperature range, potentially causing the PTC element 18 to combust or fail in an unpredictable manner, the backup fuse 16 may melt or otherwise separate as shown in FIG. 2. Thus, the backup fuse 16 ensures that the current flowing through the device 10 is arrested during an extreme overcurrent condition even if the PTC element 18 fails in a closed state ("fails closed"), thereby preventing or mitigating combustion of the PTC element 18 and/or damage to connected and surrounding circuit components.

Additionally, owning to the low surface energy of the dielectric chip 14 and the aversive, "de-wetting" characteristic of the dielectric chip 14 and the passivation layer 29 relative to the melted or semi-melted solder of the backup fuse 16 (described above), separated portions 16*a*, 16*b* of the backup fuse 16 may draw away from one another and away from the passivation layer 29 and the surface of the dielectric chip 14 and may accumulate on the lead 25 and the lead wire 26, respectively, thereby providing a galvanic opening (i.e., a permanent, non-resettable opening) in the device 10. Thus, even after the overcurrent condition subsides and the PTC element 18 cools to below its trip temperature and becomes conductive again, the separated portions 16*a*, 16*b* of the backup fuse 16 provide and maintain galvanic opening in the device 10 such that current cannot flow through the device 10.

Figure 3:
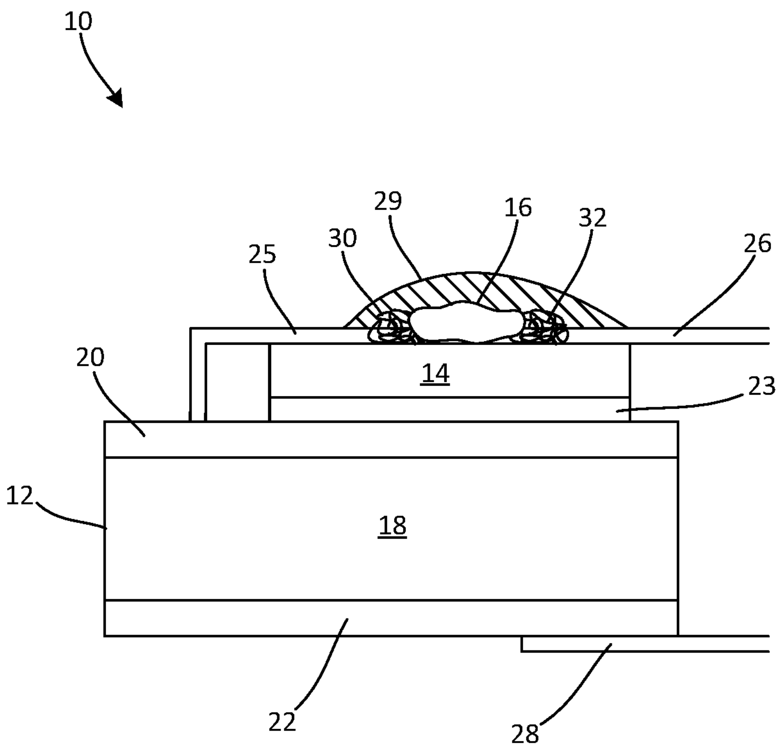
FIG. 3 is a side view illustrating a circuit protection device in accordance with another exemplary embodiment of the present disclosure.

Referring to FIG. 3, an alternative embodiment of the device 10 is provided wherein the lead 25 and the lead wire 26 terminate in mesh contacts 30, 32, respectively, and wherein the backup fuse 16 extends between the mesh contacts 30, 32. In various embodiments, the mesh contacts 30, 32 may be formed of copper mesh, silver mesh, gold mesh, etc. The present disclosure is not limited in this regard. The mesh contacts 30, 32 may provide increased surface area (relative to a conventional, solid wire or lead) for absorbing or collecting the solder of the backup fuse 16 after the solder has melted, thereby enhancing galvanic separation of the backup fuse 16.

Figure 4:
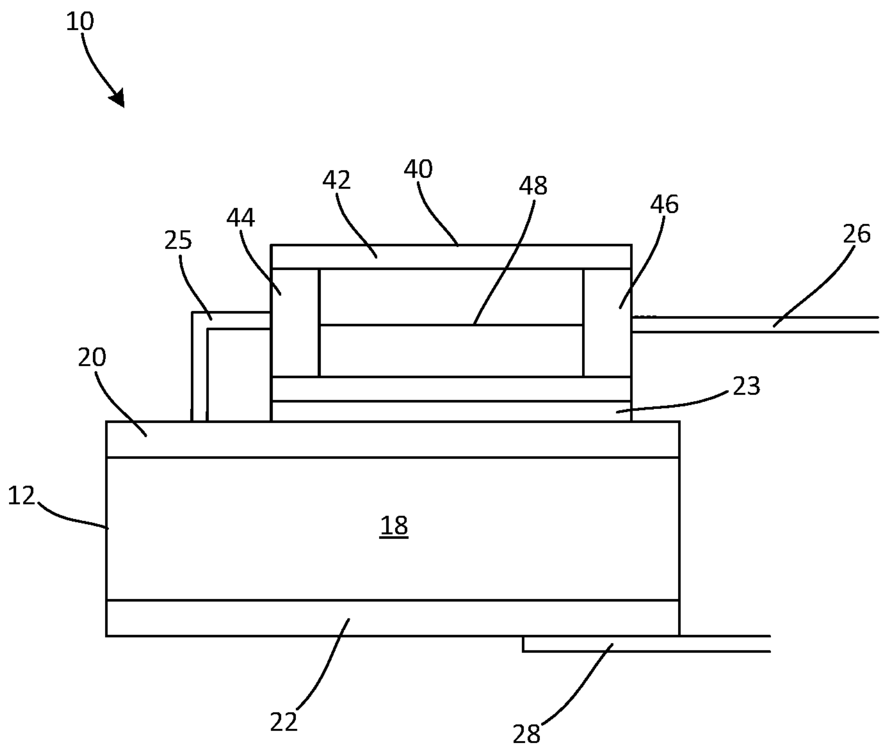
FIG. 4 is a side view illustrating a circuit protection device in accordance with another exemplary embodiment of the present disclosure.

Referring to FIG. 4, another alternative embodiment of the device 10 is provided wherein a cartridge fuse 40 is substituted for the dielectric chip 14, backup fuse 16, and passivation layer 29 shown in FIGS. 1 and 2. The cartridge fuse 40 may include a dielectric fuse body 42 having conductive terminals 44, 46 at opposing ends thereof connected to the lead 25 and the lead wire 26, respectively. The cartridge fuse 40 may further include a fusible element 48 extending through the fuse body 42 between the terminals 44, 46. Like the backup fuse 16 described above, the fusible element 48 may having a melting temperature above the normal trip temperature range of the PTC element 18. Furthermore, the material from which the fusible element 48 is formed and the material from the which the fuse body 42 is formed may be selected such that, when the fusible element 48 is in a melted or semi-melted state, the fusible element 48 may have an aversion to, or a tendency to draw away from or to bead on, the surface of the fuse body 42. That is, the material of the fuse body 42 may exhibit a significant "de-wetting" characteristic relative to the material from which the fusible element 48 is formed. Thus, in the event that melted portions of the fusible element 48 are deposited on the interior surface of the fuse body 42 upon opening of the fusible element 48, such melted portions may draw away from the interior surface of the fuse body 42 and migrate to the terminals 44, 46 to promote galvanic opening in the cartridge fuse 40.

In view of the above, it will be appreciated by those of ordinary skill in the art that the device 10 of the present disclosure provides an advantage in that it facilitates resettable overcurrent protection and effectively prevents or mitigates electrical arcing when subjected to most overcurrent conditions, and also provides galvanic opening upon the occurrence of an extreme overcurrent condition to prevent or mitigate dangerous or catastrophic failure of the PTC element 18.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A circuit protection device comprising a positive temperature coefficient (PTC) device and a backup fuse electrically connected in series with one another, the backup fuse comprising a quantity of solder disposed on a dielectric chip and having a melting temperature that is higher than a trip temperature of the PTC device, wherein the a surface of the dielectric chip exhibits a de-wetting characteristic relative to the solder such that, when the solder is melted, the solder draws away from the surface to create a galvanic opening in the backup fuse, wherein the dielectric chip is fastened to an electrode of the PTC device by a thermally conductive medium.

2. The circuit protection device of claim 1, wherein the thermally conductive medium is a thermally conductive paste.

3. The circuit protection device of claim 1, wherein the solder is SAC305 solder and the dielectric surface is formed of perfluoroalkoxy.

4. The circuit protection device of claim 1, wherein the solder is eutectic solder and the dielectric surface is formed of ethylene tetrafluoroethylene.

5. The circuit protection device of claim 1, wherein the solder is high melt solder and the dielectric surface is formed of polyvinylidene fluoride.

6. The circuit protection device of claim 1, wherein the backup fuse is connected to a first electrode of the PTC device by a lead, the circuit protection device further comprising a first lead wire electrically connected to the backup fuse and a second lead wire electrically connected to a second electrode of the PTC device, wherein the first lead wire and the second lead wire facilitate electrical connection of the circuit protection device within a circuit.

7. The circuit protection device of claim 6, further comprising first and second mesh contacts at the juncture of the first lead wire and the backup fuse and the juncture of the second lead wire and the backup fuse, respectively.

8. The circuit protection device of claim 1, wherein the backup fuse has a melting temperature that is in a range of 1 degree Celsius to 200 degrees Celsius higher than a normal trip temperature range of the PTC device.

9. The circuit protection device of claim 1, wherein the backup fuse has a melting temperature that is above a normal trip temperature range of the PTC device.

10. The circuit protection device of claim 1, further comprising a dielectric passivation layer covering the backup fuse.

11. The circuit protection device of claim 10, wherein the dielectric passivation layer exhibits a de-wetting characteristic relative to the solder such that, when the solder is melted, the solder draws away from the dielectric passivation layer to create a galvanic opening in the backup fuse.

12. A circuit protection device comprising a positive temperature coefficient (PTC) device and a backup fuse electrically connected in series with one another, the backup fuse comprising a cartridge fuse having a fusible element with a melting temperature that is higher than a trip temperature of the PTC device, wherein a fuse body of the cartridge fuse exhibits a de-wetting characteristic relative to the fusible element such that, when the fusible element is melted, the fusible element draws away from a surface of the fuse body to create a galvanic opening in the fusible element.

13. The circuit protection device of claim 12, wherein the cartridge fuse is fastened to the PTC device.

14. The circuit protection device of claim 13, wherein the cartridge fuse is fastened to an electrode of the PTC device by a thermally conductive medium.

15. The circuit protection device of claim 14, wherein the thermally conductive medium is a thermally conductive paste.

16. The circuit protection device of claim 12, wherein the backup fuse is connected to a first electrode of the PTC device by a lead, the circuit protection device further comprising a first lead wire electrically connected to the cartridge fuse and a second lead wire electrically connected to a second electrode of the PTC device, wherein the first lead wire and the second lead wire facilitate electrical connection of the circuit protection device within a circuit.

17. The circuit protection device of claim 12, wherein the fusible element has a melting temperature that is in a range of 1 degree Celsius to 200 degrees Celsius higher than a normal trip temperature range of the PTC device.

18. The circuit protection device of claim 12, wherein the fusible element has a melting temperature that is above a normal trip temperature range of the PTC device.

* * * * *